United States Patent
Noh et al.

(10) Patent No.: US 9,374,833 B2
(45) Date of Patent: Jun. 21, 2016

(54) METHOD AND DEVICE FOR EXCHANGING DATA IN WIRELESS COMMUNICATION SYSTEM

(71) Applicant: LG ELECTRONICS INC., Seoul (KR)

(72) Inventors: Min Seok Noh, Anyang-si (KR); Hak Seong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/357,759

(22) PCT Filed: Nov. 14, 2012

(86) PCT No.: PCT/KR2012/009596
§ 371 (c)(1),
(2) Date: May 12, 2014

(87) PCT Pub. No.: WO2013/073832
PCT Pub. Date: May 23, 2013

(65) Prior Publication Data
US 2014/0369286 A1     Dec. 18, 2014

Related U.S. Application Data

(60) Provisional application No. 61/560,815, filed on Nov. 17, 2011.

(51) Int. Cl.
*H04W 72/04* (2009.01)
*H04W 72/12* (2009.01)
(Continued)

(52) U.S. Cl.
CPC ...... *H04W 72/1289* (2013.01); *H04W 72/1278* (2013.01); *H04B 7/024* (2013.01); *H04L 5/0012* (2013.01); *H04L 5/0053* (2013.01); *H04W 36/0005* (2013.01); *H04W 92/20* (2013.01)

(58) Field of Classification Search
None
See application file for complete search history.

(56) References Cited

U.S. PATENT DOCUMENTS 8,676,201 B2 *   3/2014   Kazmi ................. H04W 36/30
                                                              370/331
9,094,167 B2 *   7/2015   Zhang .................. H04L 5/0053
(Continued)

FOREIGN PATENT DOCUMENTS

KR   1020100123580    11/2010
KR   1020100131341    12/2010
(Continued)

OTHER PUBLICATIONS

PCT International Application No. PCT/KR2012/009596, International Search Report, dated Apr. 1, 2013, 1 page.
(Continued)

*Primary Examiner* — Candal Elpenord
(74) *Attorney, Agent, or Firm* — Lee Hong Degerman Kang & Waimey; Jonathan Kang; Jeffrey Lotspeich

(57) ABSTRACT

The present invention relates to a method and device for exchanging data in a wireless communication system. A base station exchanges at least one of a cell identifier (ID) of a higher layer parameter, a cyclic shift parameter $n_{DMRS}^{(1)}$ and a group assignment physical uplink shared channel (PUSCH) parameter $\#_{ss}$ with another base station through an X2 interface and performs scheduling of a terminal on the basis of the exchanged information.

6 Claims, 8 Drawing Sheets

(51) Int. Cl.
*H04W 36/00* (2009.01)
*H04L 5/00* (2006.01)
*H04B 7/02* (2006.01)
*H04W 92/20* (2009.01)

(56) References Cited

U.S. PATENT DOCUMENTS

| | | | | |
|---|---|---|---|---|
| 2010/0142466 | A1* | 6/2010 | Palanki | H04J 11/0053 370/329 |
| 2011/0170435 | A1* | 7/2011 | Kim | H04L 5/0023 370/252 |
| 2011/0235555 | A1* | 9/2011 | Zhang | H04L 5/0007 370/280 |
| 2011/0285792 | A1* | 11/2011 | Byun | B41J 2/06 347/54 |
| 2012/0008555 | A1* | 1/2012 | Zhang | H04L 1/0606 370/328 |
| 2012/0044878 | A1* | 2/2012 | Ratasuk | H04W 74/0866 370/329 |
| 2013/0010720 | A1* | 1/2013 | Lohr | H04L 1/0026 370/329 |
| 2013/0114450 | A1* | 5/2013 | Xu | H04W 72/0426 370/252 |

FOREIGN PATENT DOCUMENTS

| | | |
|---|---|---|
| KR | 1020110100629 | 9/2011 |
| KR | 1020110117720 | 10/2011 |

OTHER PUBLICATIONS

CATT, "Considerations on UE-specific DM-RS configuration," 3GPP TSG RAN WG1 Meeting #67, R1-113732, Nov. 2011, 3 pages.
Korean Intellectual Property Office Application Serial No. 10-2014-7015519, Notice of Allowance dated May 28, 2015, 3 pages.

* cited by examiner

METHOD AND DEVICE FOR EXCHANGING DATA IN WIRELESS COMMUNICATION SYSTEM

CROSS-REFERENCE TO RELATED APPLICATIONS

This application is the National Stage filing under 35 U.S.C. 371 of International Application No. PCT/KR2012/009596, filed on Nov. 14, 2012, which claims the benefit of U.S. Provisional Application Ser. No. 61/560,815 filed on Nov. 17, 2011, the contents of which are all hereby incorporated by reference herein in their entirety.

BACKGROUND OF THE INVENTION

1. Field of the Invention

The present invention relates to wireless communications, and more particularly, to a method and apparatus for exchanging data in a wireless communication system.

2. Related Art

The next-generation multimedia wireless communication systems which are recently being actively researched are required to process and transmit various pieces of information, such as video and wireless data as well as the initial voice-centered services. The 4th generation wireless communication systems which are now being developed subsequently to the 3rd generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h} = y/p = h + n/p = h + \hat{n} \qquad \text{<Equation 1>}$$

The accuracy of the channel estimation value ĥ estimated using the reference signal p is determined by the value ñ. To accurately estimate the value h, the value ñ must converge on 0. To this end, the influence of the value ñ has to be minimized by estimating a channel using a large number of reference signals. A variety of algorithms for a better channel estimation performance may exist.

In the $3^{rd}$ generation partnership project (3GPP) long term evolution advanced (LTE-A) rel-11, a new deployment scenario may be discussed. Deployment scenario A represents the network that is made up of the indoor and outdoor low power radio remote heads (RRHs) located within the coverage of the macro cell, and the transmission/reception point generated by the RRHs has the cell ID that is identical to that of the macro cell. Deployment scenario A may be called to coordinated multi-point (CoMP) scenario 4. Deployment scenario B represents the network that is made up of indoor and outdoor small cells only. Deployment scenario C represents the network that is made up of indoor and outdoor low power RRHs only, and all of the transmission/reception points generated by the RRHs have the same cell IDs. Deployment scenario D represents the network that is made up of the heterogeneous deployment of the small cell within the indoor and outdoor coverage, and the low power RRHs located in the coverage of the macro cell have a different cell ID with the macro cell. Deployment scenario D may be called to CoMP scenario 3.

By the new deployment scenarios being discussed, it may be necessary to improve the performance on the uplink (UL) demodulation reference signal (DMRS).

SUMMARY OF THE INVENTION

The present invention provides a method and apparatus for exchanging data in a wireless communication system. The present invention provides a method for exchanging higher layer signaling information between different cells in order to guarantee orthogonality of UL DMRSs of different user equipments, which belong to different cells, in CoMP scenario 3.

In an aspect, a method for exchanging, by a first eNodeB (eNB), data in a wireless communication system is provided. The method includes exchanging at least one of a cell identifier (ID), a cyclic shift parameter $n_{DMRS}^{(1)}$, or a group assignment physical uplink shared cannel (PUSCH) parameter $\Delta_{SS}$, which are higher layer parameters, with a second eNB through an X2 interface, and performing scheduling of a user equipment (UE) based on the exchanged information.

In another aspect, a first eNodeB (eNB) for exchanging data in a wireless communication system is provided. The first eNB includes a radio frequency (RF) unit for transmitting or receiving a radio signal, and a processor connected with the RF unit, and configured to exchange at least one of a cell identifier (ID), a cyclic shift parameter $n_{DMRS}^{(1)}$, or a group assignment physical uplink shared cannel (PUSCH) parameter $\Delta_{SS}$, which are higher layer parameters, with a second eNB through an X2 interface, and perform scheduling of a user equipment (UE) based on the exchanged information.

In CoMP scenario 3, the orthogonality of the UL DMRSs of different user equipments, which belong to different cells with one another, can be guaranteed.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3$^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
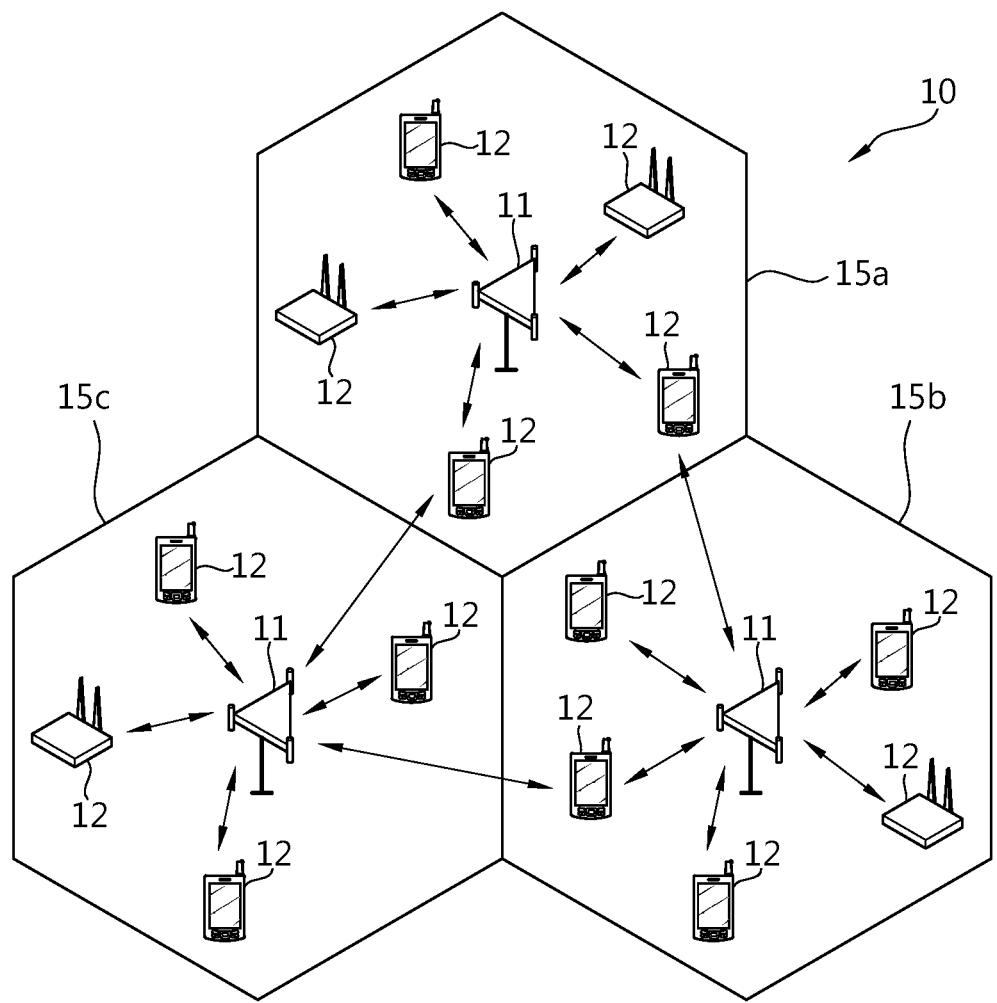
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
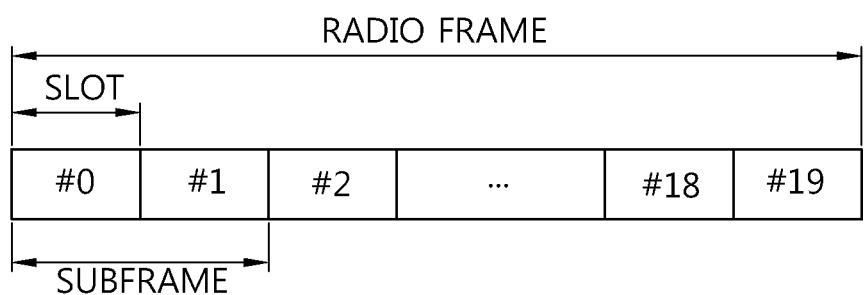
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
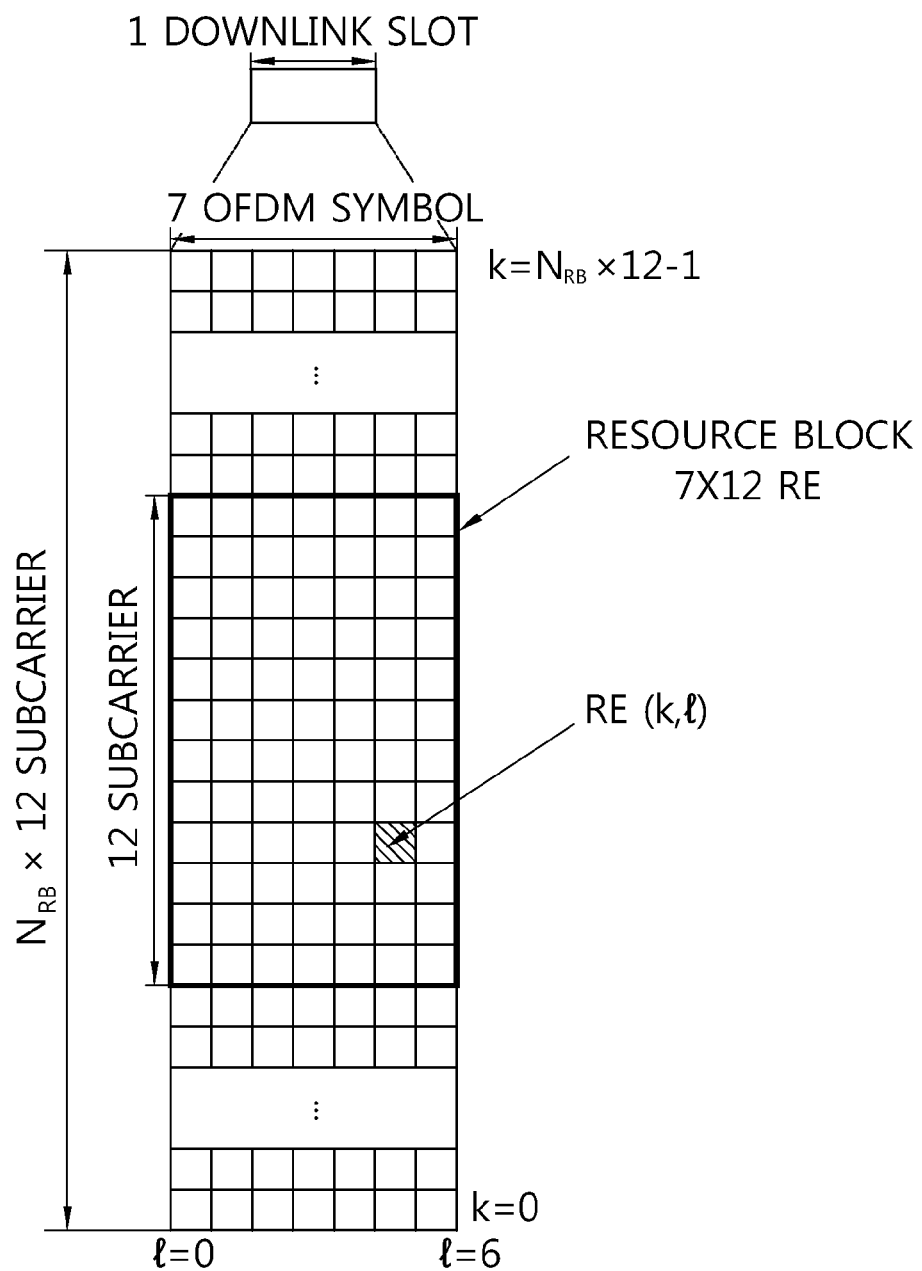
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indices (k,l) in the slot. Here, k (k=0, . . ., $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
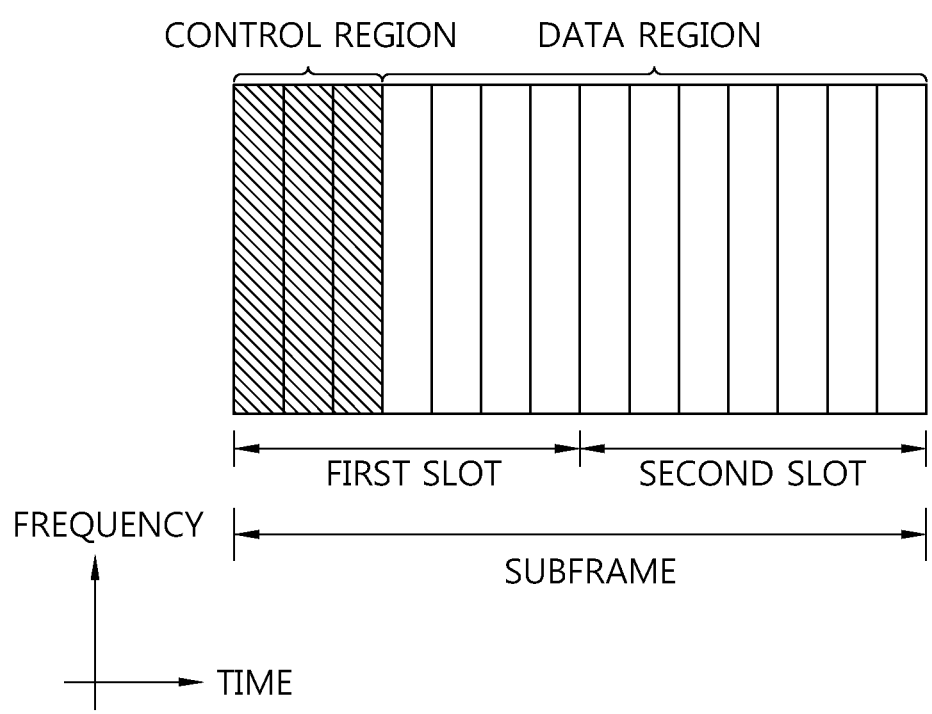
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
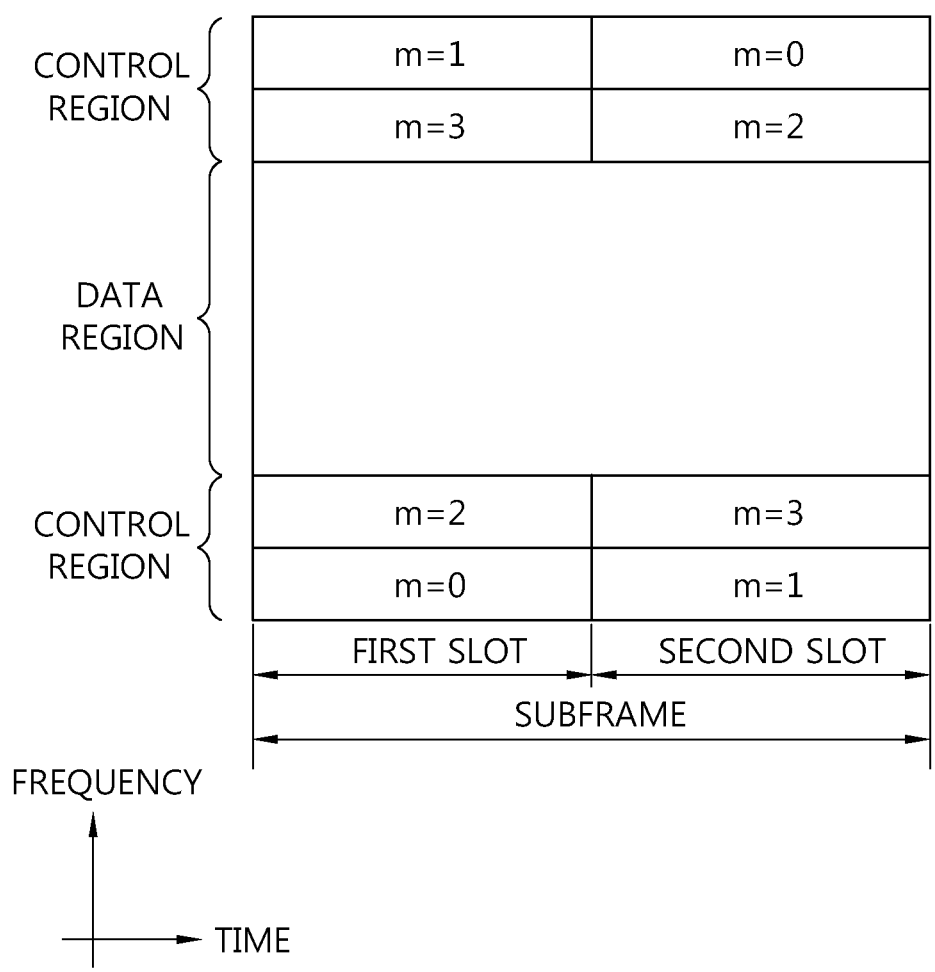
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In 3GPP LTE-A system, the SRS may not be precoded and may be an antenna-specific reference signal.

A reference signal sequence $r_{u,v}^{(\alpha)}(n)$ may be defined based on a basic sequence $b_{u,v}(n)$ and a cyclic shift $\alpha$ according to Equation 2.

$$r_{u,v}^{(\alpha)}(n) = e^{j\alpha n} b_{u,v}(n), 0 \leq n < M_{sc}^{RS} \quad \text{<Equation 2>}$$

In Equation 2, $M_{sc}^{RS}$ ($1 \leq M \leq N_{RB}^{max,UL}$) is the length of the reference signal sequence. and $M_{sc}^{RS}=m^*N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value $\alpha$ from one basic sequence.

A basic sequence $b_{u,v}(n)$ is divided into a plurality of groups. Here, $u \in \{0,1,\ldots,29\}$ indicates a group number, and v indicates a basic sequence number within the group. The basic sequence depends on the length $M_{sc}^{RS}$ of the basic sequence. Each group includes a basic sequence (v=0) having a length of $M_{sc}^{RS}$ for m ($1 \leq m \leq 5$) and includes 2 basic sequences (v=0,1) having a length of $M_{sc}^{RS}$ for m ($6 \leq m \leq n_{RB}^{max,UL}$). The sequence group number u and the basic sequence number v within a group may vary according to time as in group hopping or sequence hopping.

If the length of the reference signal sequence is $3N_{sc}^{RB}$ or higher, the basic sequence may be defined by Equation 3.

$$b_{u,v}(n) = x_q(n \bmod N_{ZC}^{RS}), 0 \leq n < M_{sc}^{RS} \quad \text{<Equation 3>}$$

In Equation 3, q indicates a root index of a Zadoff-Chu (ZC) sequence. $N_{ZC}^{RS}$ is the length of the ZC sequence and may be a maximum prime number smaller than $M_{sc}^{RS}$. The ZC sequence having the root index q may be defined by Equation 4.

$$x_q(m) = e^{-j\frac{\pi q m(m+1)}{N_{ZC}^{RS}}}, 0 \leq m \leq N_{ZC}^{RS} - 1 \quad \text{<Equation 4>}$$

q may be given by Equation 5.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{<Equation 5>}$$

If the length of the reference signal sequence is $3N_{sc}^{RB}$ or less, the basic sequence may be defined by Equation 6.

$$b_{u,v}(n) = e^{j\phi(n)\pi/4}, 0 \leq n \leq M_{sc}^{RS} - 1 \quad \text{<Equation 6>}$$

Table 1 is an example where $\phi(n)$ is defined when $M_{sc}^{RS} = N_{sc}^{RB}$.

TABLE 1

| | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | 3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | 1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

Table 2 is an example where $\phi(n)$ is defined when $M_{sc}^{RS} = 2^*N_{sc}^{RB}$.

TABLE 2

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |

TABLE 2-continued

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −1 | −3 | −3 | −3 | 3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | 3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 3 | −1 | 1 | −3 | −3 | −3 | −1 | −1 | | | |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Hopping of a reference signal may be applied as follows.

The sequence group number of a slot $n_s$ may be defined based on a group hopping pattern $f_{gh}(n_s)$ and a sequence shift pattern $f_{ss}$ according to Equation 7.

$$u=(f_{gh}(n_s)+f_{ss}) \bmod 30 \quad \text{<Equation 7>}$$

17 different group hopping patterns and 30 different sequence shift patterns may exist. The group hopping may be enabled or not enabled by Group-hopping-enabled parameter, which is a cell-specific parameter, provided by a higher-layer. Further, the group hopping for PUSCH may be disabled for a specific UE by Disable-sequence-group-hopping parameter, which is a UE-specific parameter. A PUCCH and PUSCH may have the same group hopping pattern, and may have different sequence shift patterns.

A group hopping pattern $f_{gh}(n_s)$ is the same for the PUSCH and PUCCH, and may be defined by Equation 8.

$$f_{gh}(n_s) = \begin{cases} 0 & \text{if group hopping is disabled} \\ \left(\sum_{i=0}^{7} c(8n_s+i) \cdot 2^i \right) \bmod 30 & \text{if group hopping is enabled} \end{cases} \quad \text{<Equation 8>}$$

In Equation 8, c(i) is a pseudo random sequence that is a PN sequence and may be defined by a Gold sequence of a length-31. Equation 9 shows an example of a gold sequence c(n).

$$c(n)=(x_1(n+N_c)+x_2(n+N_c)) \bmod 2$$

$$x_1(n+31)=(x_1(n+3)+x_1(n)) \bmod 2$$

$$x_2(n+31)=x_2(n+3)+x_2(n+2)+x_1(n+1)+x_1(n)) \bmod 2 \quad \text{<Equation 9>}$$

Here, Nc=1600, $x_1(i)$ is a first m-sequence, and $x_2(i)$ is a second m-sequence. A pseudo random sequence generator may be initialized to $$c_{init} = \left\lfloor \frac{N_{ID}^{cell}}{30} \right\rfloor$$

in the first of each radio frame.

Definition of a sequence shift pattern $f_{ss}$ may be different for the PUCCH and PUSCH. The sequence shift pattern of the PUCCH may be $f_{ss}^{PUCCH}=N_{ID}^{cell} \bmod 30$. The sequence shift pattern of the PUSCH may be $f_{ss}^{PUSCH}=(f_{ss}^{PUCCH}+\Delta_{ss}) \bmod 30$ and $\Delta_{ss} \in \{0,1,\ldots,29\}$ may be configured by a higher layer.

Sequence hopping may be applied to only a reference signal sequence having a length longer than $6N_{sc}^{RB}$. For a reference signal sequence having a length shorter than $6N_{sc}^{RB}$, a basic sequence number v within a basic sequence group is 0. For a reference signal sequence having a length longer than $6N_{sc}^{RB}$, a basic sequence number v within a basic sequence group of a slot $n_s$ may be defined by Equation 10.

$$v = \begin{cases} c(n_s) & \text{if group hopping is disabled} \\ & \text{and sequence hopping is enabled} \\ 0 & \text{otherwise} \end{cases} \quad \text{<Equation 10>}$$

c(i) may be represented by an example of Equation 9. The sequence hopping may be enabled or not enabled by Sequence-hopping-enabled parameter, which is a cell-specific parameter, provided by a higher-layer. Further, the sequence hopping for PUSCH may be disabled for a specific UE by Disable-sequence-group-hopping parameter, which is a UE-specific parameter. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

PUSCH DMRS sequence $r_{PUSCH}^{(\lambda)}(\cdot)$ according to layers $\lambda(0,1,\ldots,\lambda-1)$ may be defined by Equation 11.

$$r_{PUSCH}^{(\lambda)}(m \cdot M_{sc}^{RS}+n)=w^{(\lambda)}(m)r_{u,v}^{(\alpha_\lambda)}(n) \quad \text{<Equation 11>}$$

In Equation 11, m=0,1, . . . and n=0, . . . , $M_{sc}^{RS}-1$. $M_{sc}^{RS}=M_{sc}^{PUSCH}$. Orthogonal sequence w(λ)(m) may be determined according to Table 4 described below.

α=2πncs/12, that is, a cyclic shift is given within slot $n_s$, and $n_{cs}$ may be defined by Equation 12.

$$n_{cs}=(n_{DMRS}^{(1)}+n_{DMRS}^{(2)}+n_{PRS}(n_s))\bmod 12 \quad \text{<Equation 12>}$$

In Equation 12, $n_{DMRS}^{(1)}$ may be determined by a cyclicShift parameter provided by a higher layer. Table 3 shows an example of $n_{DMRS}^{(1)}$ determined by the cyclicShift parameter.

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 12, $n_{DMRS,\lambda}^{(2)}$ may be defined by a DMRS cyclic shift field within a DCI format 0 for a transport block according to corresponding PUSCH transmission. Table 4 shows an example of $n_{DMRS,\lambda}^{(2)}$ determined by the DMRS cyclic shift field.

TABLE 4

| DMRS cyclic shift field | $n_{DMRS,\lambda}^{(2)}$ | | | | $[w^{(\lambda)}(0)\ w^{(\lambda)}(1)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

$n_{PN}(n_s)$ may be defined by Equation 13.

$$n_{PN}(n_s)=\sum_{i=0}^{7}c(8N_{symb}^{UL} \cdot n_s+i)\cdot 2^i \quad \text{<Equation 13>}$$

c(i) may be represented by the example of Equation 9 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

The vector of the reference signal may be precoded according to Equation 14 below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \quad \text{<Equation 14>}$$

In Equation 14, P represents the number of the antenna ports which is used to transmit the PUSCH. W represents the precoding matrix. For the PUSCH transmission that uses a single antenna port, p=1, W=1, and r=1. In addition, for the spatial multiplexing, p=2 or 4.

For each antenna port which is used to transmit the PUSCH, the DMRS sequence is multiplied to the amplitude scaling factor, $\beta_{PUSCH}$, and sequentially mapped to the resource elements. The set of the physical resource blocks which is used in mapping is identical to the set of the physical resource blocks which is used in transmitting the corresponding PUSCH. In the subframe, the DMRS sequence may be mapped to the resource elements in the direction that the frequency is increasing in the frequency domain first, and in the direction that the slot number is increasing. The DMRS sequence may be mapped to the fourth SC-FDMA symbol in case of the normal CP, and mapped to the third SC-FDMA symbol (SC-FDMA symbol index 2) in case of the extended CP.

Figure 6:
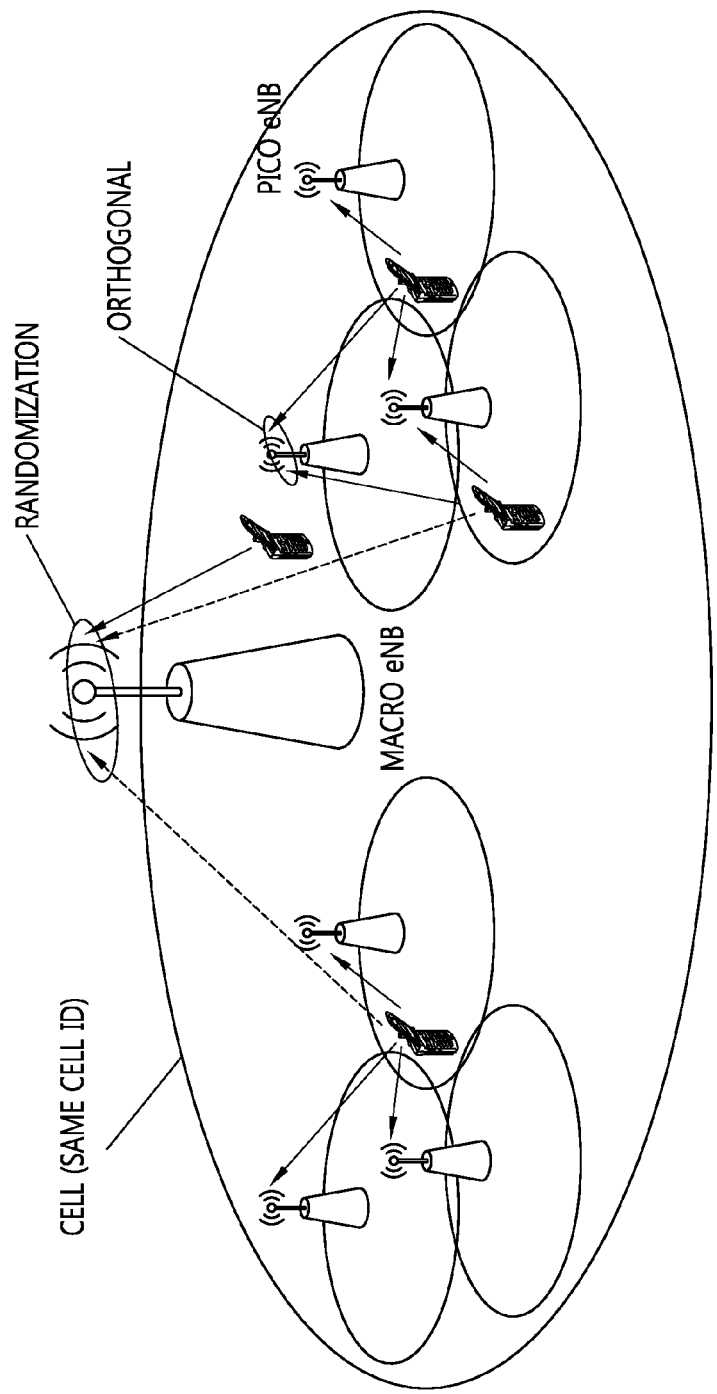
FIG. 6 shows an example of a deployment scenario of CoMP scenario 3.

FIG. 6 shows an example of a deployment scenario of CoMP scenario 3.

Referring to FIG. 6, CoMP scenario 3 may be referred to a heterogeneous network that has different cell IDs. The macro eNB provides a macro cell coverage. In FIG. 6, the macro eNB has cell ID #1. At least one pico eNB exists within the macro cell coverage. In FIG. 6, the pico eNB has cell ID #2. That is, the macro eNB and the pico eNB have different cell IDs. In CoMP scenario 3, the CoMP UE may perform the CoMP transmission with the macro eNB and the pico eNB.

FIG. 6 shows an example of the uplink CoMP transmission in which the CoMP UE transmits a signal to the macro eNB and the pico eNB.

In CoMP scenario 3 as shown in FIG. 6, even in case the UL RS transmitted by each of the multiple UEs is transmitted through different bandwidth while being overlapped, high correlation among the UL RS sequences does not occur because the UL RS sequence is generated based on different cell IDs. That is, the UL RS transmitted by the multiple UEs are not orthogonal. However, if the CoMP UE performs the uplink CoMP transmission, the performance gain may be improved by the orthogonality of UL RS among cells.

Accordingly, following methods may be applied to guarantee the orthogonality among the UL RSs which are transmitted by the multiple UEs in CoMP scenario 3.

1) Application of the cyclic shift: The cyclic shift may be applied to guarantee the orthogonality among the UL RSs. However, as the number of the cell increases, it may be difficult to find the proper pair of the cyclic shifts among the combination including the UL DMRS sequences that have different lengths and the different sequence group. In addition, even in the case that the pair of the cyclic shift exists, there may be limit in the scheduling.

2) Application of the orthogonal cover code (OCC): In order to maintain the orthogonality of the UL DMRS among different UEs that have different bandwidths respectively, the OCC may be applied. Accordingly, the orthogonality of the UL DMRS among different UEs that have different bandwidths being included in different nodes or RRHs respectively may be guaranteed without any additional mechanism or signaling. The base station may allocate different OCCs, that is implicitly indicated by the cyclic shift index within the UL DCI format, to the UL DMRS sequence that have different lengths respectively. Alternatively, the base station may allocate different OCCs respectively, that is indicated by the OCC index, to the UL DMRS sequence that have a different length, and each OCC index is configured independently and explicitly transmitted. The OCC index corresponding to each UL DMRS sequence may be dynamically signaled through the PDCCH, or may be signaled through the radio resource control (RRC). In addition, it may be necessary to set up the Disable-sequence-group-hopping parameter, the UE-specific parameter, as enable for the DMRS multiplexing among different UEs that belong to different nodes or different RRHs respectively. That is, by setting the group hopping or the sequence hopping not to be applied to the UL DMRS sequence that is allocated to each slot of the subframe, the UEs that belong to different nodes or different RRHs with one another may be multiplexed in DMRS based on the OCC.

3) Allocation of the virtual cell ID: In order to multiplex the DMRS among the UEs that belong to different nodes or different RRHs respectively, the virtual cell ID, which is not an ID of the cell to which each UE belongs, may be allocated to the each UE. The virtual cell ID may be a cell ID which is not an ID of the cell to which each UE belongs, or may be a cell ID which is not allocated to the cell ID or the pre-reserved cell ID for a specific scenario. The sequence group with for the UL DMRS of the corresponding UE may be allocated based on the different virtual cell IDs, not based on the cell ID, and accordingly, it may be possible to allocate different sequence groups for the UL DMRS of each UE.

In order to guarantee the orthogonality of the UL DMRS between UEs which belong to different cells, different OCCs may be allocated to each UL DMRS regardless of whether the UL DMRS transmitted by each UE uses the same bandwidth or a different bandwidth. That is, for the UL DMRS which is mapped to one SC-FDMA symbol in each of two slots, different OCCs having a length of 2 may be applied to the UL DMRSs of different UEs. In this case, cyclic shift hopping between slots of the UL DMRS may not be applied. Further, group hopping and sequence hopping between slots of the UL DMRS may not be applied. Each OCC corresponds to an OCC index. The OCC index allocated to each UE may be explicitly signaled through PDCCH. That is, the OCC index may be added in a UL DCI format to be signaled through the PDCCH. The OCC index may be configured as additional 1 bit in the UL DCI format. Further, the OCC index may be RRC signaled. Further, the OCC index may be implicitly indicated. For example, similarly to a method for multiplexing between layers used in LTE rel-10, that different OCCs are allocated may be indicated by assigning different CSI indices to each UE.

In CoMP scenario 3, a macro eNB and pico eNB may independently perform scheduling. The orthogonality of the UL DMRS of UEs which belong to different cells may be guaranteed based on the virtual cell ID of the UE, and a base sequence of the UL DMRS transmitted by different UEs may be equally configured. Further, cyclic shift hopping may be equally configured. Meanwhile, the separation between UEs is performed through a cyclic shift parameter $n_{DMRS}^{(1)}$, transmitted through the RRC by the macro eNB and the pico eNB in a cell-specific manner respectively, and $n_{DMRS,\lambda}^{(2)}$ transmitted through the UL DCI format. However, since the macro eNB and the pico eNB independently perform the scheduling, each of the macro eNB and the pico eNB may not guarantee that the cyclic shifts allocated to the scheduling UEs are different from each other. That is, the cyclic shift multiplexing may not be performed between different UEs. Accordingly, there is a need to exchange information required when the macro eNB and the pico eNB perform the scheduling.

Figure 7:
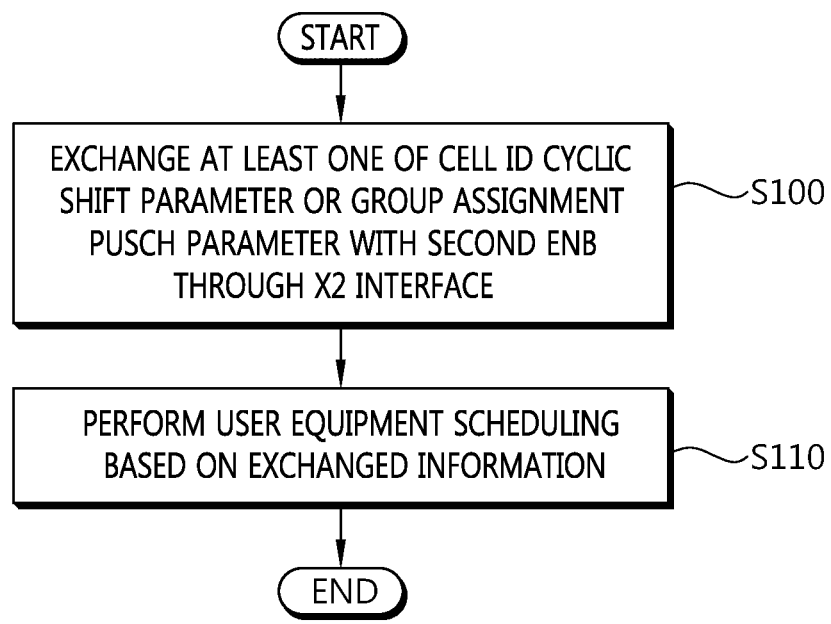
FIG. 7 shows an embodiment of a method for exchanging data according to an embodiment of the present invention.

FIG. 7 shows an embodiment of a method for exchanging data according to an embodiment of the present invention.

In step S100, a first eNB exchanges at least one of, a cell ID, a cyclic shift parameter $n_{DMRS}^{(1)}$, and a group assignment PUSCH parameter $\Delta_{SS}$ with a second eNB through an X2 interface. In step S110, the first eNB performs the scheduling of the UE based on the exchanged information. The macro eNB and the pico eNB may exchange or coordinate a higher layer parameter required for the scheduling of the UE through the X2 interface. Accordingly, when the UE is scheduled by using the corresponding information, the orthogonality of the UL DMRS of different UEs, which belong to different cells, through the cyclic shift and/or the OCC may be guaranteed.

Further, the macro eNB and the pico eNB may exchange or coordinate the $n_{DMRS,\lambda}^{(2)}$ transmitted through the UL DCI format on the PDCCH, as well as the higher layer parameter, through the X2 interface. When the macro eNB and the pico eNB perform the scheduling of the UE by using the corresponding information, the orthogonality of the UL DMRS of different UEs, which belong to different cells, through the cyclic shift and/or the OCC may be guaranteed.

Figure 8:
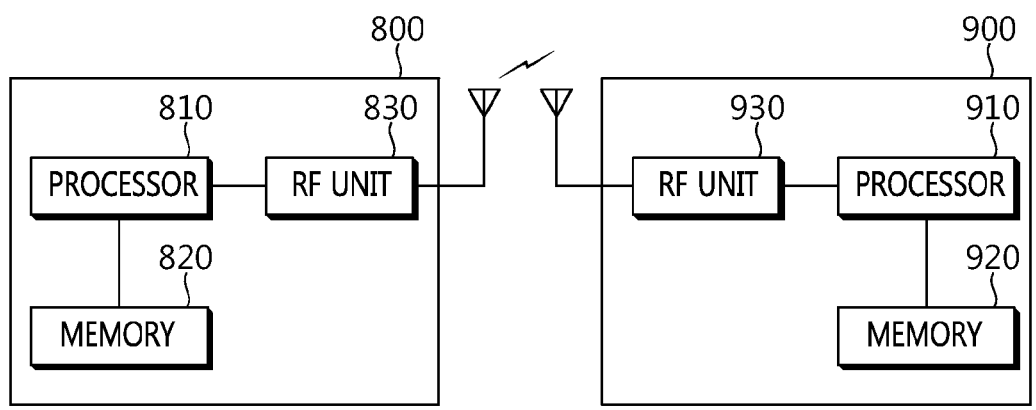
FIG. 8 is a block diagram showing wireless communication system to implement an embodiment of the present invention.

FIG. 8 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for exchanging, by a first eNodeB (eNB), data in a wireless communication system, the method comprising:
    exchanging, with a second eNB through an X2 interface, at least one of a cell identifier (ID), a cyclic shift parameter, or a group assignment physical uplink shared channel (PUSCH) parameter, which are signaled by a higher layer;
    exchanging, with the second eNB through the X2 interface, a cyclic shift demodulation references signal (DMRS) field included in downlink formation information (DCI), wherein the cyclic shift DMRS field is used for indicating a cyclic shift for first uplink (UL) DMRSs and second UL DMRSs;
    receiving, from a plurality of user equipments (UEs) communicating with the first eNB, the first UL DMRSs;
    receiving, from a plurality of UEs communicating with the second eNB, the second UL DMRSs;
    distinguishing, from the second UL DMRSs, the first UL DMRSs by using the cyclic shift parameter and the cyclic shift DMRS field, wherein base sequences of the first UL DMRSs and the second UL DMRSs are equal to each other, wherein hopping patterns for the cyclic shift for the first UL DMRSs and the second UL DMRSs are equal to each other; and
    performing scheduling of the plurality of UEs communicating with the first eNB based on the cyclic shift parameter and the cyclic shift DMRS field.

2. The method of claim 1, wherein the first eNB is a macro eNB, and the second eNB is a pico eNB.

3. The method of claim 1, wherein the cyclic shift for the first uplink UL DMRSs and the cyclic shift for the second UL DMRSs are different from each other.

4. A first eNodeB (eNB) for exchanging data in a wireless communication system, the first eNB comprising:
    a radio frequency (RF) unit for transmitting or receiving a radio signal; and
    a processor connected with the RF unit, and configured to:
    exchange, with a second eNB through a X2 interface, at least one of a cell identifier (ID), a cyclic shift parameter, or a group assignment physical uplink shared channel (PUSCH) parameter, which are signaled by a higher layer;
    exchange, with the second eNB through the X2 interface, a cyclic shift demodulation references signal (DMRS) field included in downlink formation information (DCI), wherein the cyclic shift DMRS field is used for indicating a cyclic shift for first uplink (UL) DMRSs and second UL DMRSs;
    receive, from a plurality of user equipments (UEs) communicating with the first eNB, the first UL DMRSs;
    receive, from a plurality of UEs communicating with the second eNB, the second UL DMRSs;
    distinguish, from the second UL DMRSs, the first UL DMRSs by using the cyclic shift parameter and the cyclic shift DMRS field, wherein base sequences of the first UL DMRSs and the second UL DMRSs are equal to each other, wherein hopping patterns for the cyclic shift for the first UL DMRSs and the second UL DMRSs are equal to each other
    perform scheduling of a the plurality of UEs communicating with the first eNB based on the cyclic shift parameter and the cyclic shift DMRS field.

5. The first eNB of claim 4, wherein the first eNB is a macro eNB, and the second eNB is a pico eNB.

6. The first eNB of claim 4, wherein the cyclic shift for the first uplink UL DMRSs and the cyclic shift for the second UL DMRSs are different from each other.

* * * * *